(12) United States Patent
Kageyama et al.

(10) Patent No.: US 10,823,604 B2
(45) Date of Patent: Nov. 3, 2020

(54) COMBINATION WEIGHING DEVICE WHICH USES DIFFERENT PARAMETERS TO CONTROL CONVEYING UNITS

(71) Applicant: Ishida Co., Ltd., Kyoto (JP)

(72) Inventors: Toshiharu Kageyama, Ritto (JP); Shinya Ikeda, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 204 days.

(21) Appl. No.: 16/082,227

(22) PCT Filed: Mar. 6, 2017

(86) PCT No.: PCT/JP2017/008720
§ 371 (c)(1),
(2) Date: Sep. 4, 2018

(87) PCT Pub. No.: WO2017/154819
PCT Pub. Date: Sep. 14, 2017

(65) Prior Publication Data
US 2020/0141791 A1 May 7, 2020

(30) Foreign Application Priority Data
Mar. 7, 2016 (JP) .................... 2016-043229

(51) Int. Cl.
*G01G 19/393* (2006.01)
(52) U.S. Cl.
CPC .................. *G01G 19/393* (2013.01)
(58) Field of Classification Search
CPC ................ G01G 19/387; G01G 19/393
See application file for complete search history.

(56) References Cited

U.S. PATENT DOCUMENTS

| 4,811,256 A | 3/1989 | Yamada et al. |
| 5,340,949 A * | 8/1994 | Fujimura ............... G01G 17/04 141/128 |
| 8,688,264 B2 * | 4/2014 | Nignon ................... B07C 5/28 700/223 |

FOREIGN PATENT DOCUMENTS

| EP | 2827115 A1 | 1/2015 |
| JP | 2009-008400 A | 1/2009 |
| JP | 2010-008246 A | 1/2010 |
| JP | 2010-038604 A | 2/2010 |

(Continued)

OTHER PUBLICATIONS

Computer translation of JP 2010-195433 downloaded from the JPO website May 20, 2020.*

(Continued)

*Primary Examiner* — Randy W Gibson
(74) *Attorney, Agent, or Firm* — Studebaker & Brackett PC

(57) ABSTRACT

A combination weighing device includes a plurality of conveying units, a weighing unit, a controller, a learning unit that updates parameters for setting operations of the conveying units by learning, and a storage unit that stores at least some parameters among the parameters updated by the learning unit, wherein in a case in which work of the device is temporarily suspended and then restarted, a controller sets, for the conveying units, a restart parameter corresponding to a different parameter from a setting parameter set for an operation of the conveying units immediately before temporary suspension among the parameters stored in the storage unit to cause an operation.

18 Claims, 5 Drawing Sheets

(56) References Cited

FOREIGN PATENT DOCUMENTS

JP    2010-195433 A    9/2010
JP    2012-103044 A    5/2012

OTHER PUBLICATIONS

The extended European search report issued by the European Patent Office dated Sep. 19, 2019, which corresponds to European Patent Application No. 17763159.5 and is related to U.S. Appl. No. 16/082,227.
International Search Report issued in PCT/JP2017/008720; dated May 9, 2017.
International Preliminary Report on Patentability and Written Opinion issued in PCT/JP2017/008720; dated Sep. 11, 2018.

* cited by examiner

Fig.4
(A)
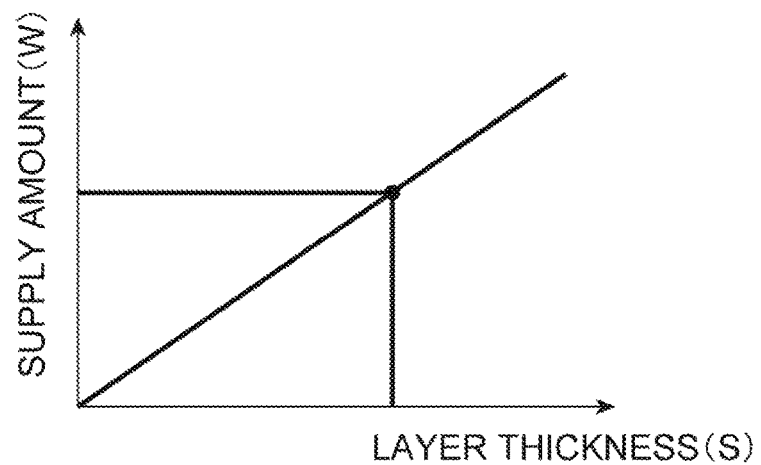
(B)
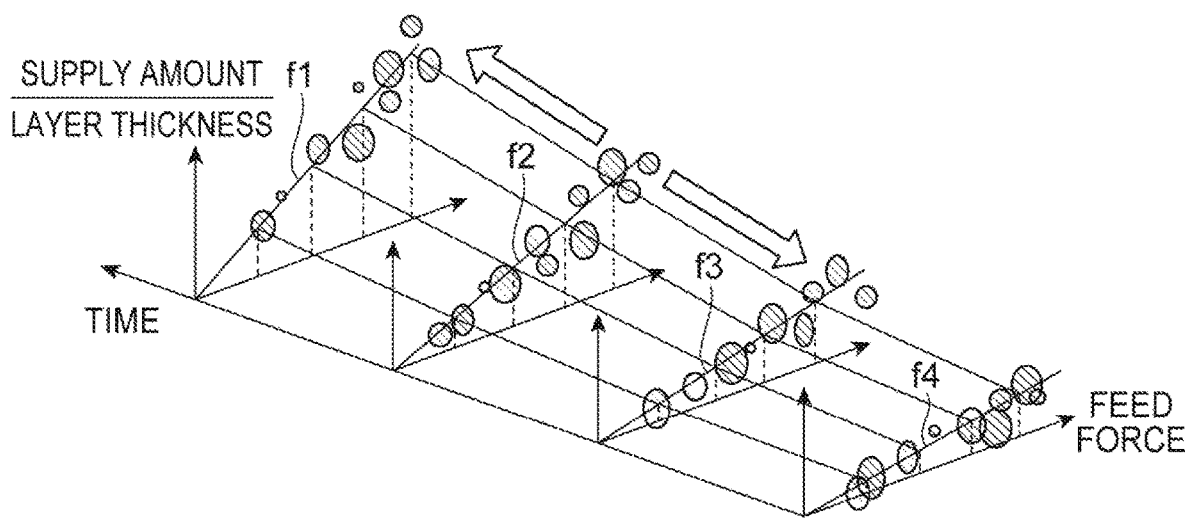

COMBINATION WEIGHING DEVICE WHICH USES DIFFERENT PARAMETERS TO CONTROL CONVEYING UNITS

TECHNICAL FIELD

The present invention relates to a combination weighing device.

BACKGROUND ART

A combination weighing device includes a conveying unit that conveys articles, a plurality of hoppers that temporarily stores the articles conveyed by the conveying unit, a weighing unit that outputs a weighing value according to the mass of the articles stored in each of the hoppers, and a controller that selects a combination of weighing values from a plurality of weighing values output by the weighing unit so that a total value becomes a target weighing value and causes a hopper corresponding to the combination to discharge the articles.

For example, a combination weighing device described in Patent Literature 1 includes a parameter setting unit that sets a parameter for controlling a conveying force of a conveying unit. A controller controls the conveying force of the conveying unit based on the parameter set in the parameter setting unit.

CITATION LIST

Patent Literature

Patent Literature 1: Japanese Unexamined Patent Publication No. 2012-103044

SUMMARY OF INVENTION

Technical Problem

In the combination weighing device, the articles may adhere to the conveying unit, etc. in some cases. For this reason, the conveying unit is properly cleaned. The conveying unit is cleaned in a state in which work of the combination weighing device is temporarily suspended. A state of the conveying unit is different between before and after cleaning of the conveying unit. This is because, for example, the articles adhering to the conveying unit are removed by cleaning. For this reason, when the conveying unit after cleaning is controlled using a parameter immediately before temporarily suspending the combination weighing device, control not suitable for the state of the conveying unit is performed, and work efficiency decreases.

In addition, as another example, in the combination weighing device, when an abnormality is found in a conveying unit, etc., work of the combination weighing device is temporarily suspended, and then the conveying unit in which the abnormality is found is removed and replaced with another conveying unit. In this case, similarly, when the conveying unit after conveyance is controlled using a parameter immediately before temporarily suspending the combination weighing device, control not suitable for the state of the conveying unit after replacement is performed, and work efficiency decreases.

An object of an aspect of the invention is to provide a combination weighing device that can be restarted without remarkably decreasing work efficiency after restart when compared to that before temporary suspension even in a case in which a control characteristic related to an operation of a member associated with an operation of the device changes due to cleaning, replacement, etc. after the device is temporarily suspended and until the device is restarted.

Solution to Problem

A combination weighing device according to an aspect of the invention includes a plurality of conveying units that conveys articles, a plurality of hoppers that temporarily stores the articles conveyed by the conveying units, a weighing unit that weighs a weighing value according to a mass of the articles stored in each of the hoppers, a controller that selects a combination of weighing values from a plurality of weighing values weighed by the weighing unit and associated with each of the plurality of hoppers so that a total value corresponds to a target weighing value, and causes the hopper corresponding to the combination to discharge the articles, a learning unit that updates parameters for setting operations of the conveying units by learning, and a storage unit that stores at least some parameters among the parameters updated by the learning unit, in which the controller causes the storage unit to store the parameters updated by the learning unit, and sets, for the conveying units, a restart parameter corresponding to a different parameter from a setting parameter set for an operation of the conveying units immediately before temporary suspension among the parameters stored in the storage unit to cause an operation in a case in which work of the device is temporarily suspended and then restarted.

In the combination weighing device according to the aspect of the invention, when the work of the device is temporarily suspended and then restarted, the restart parameter corresponding to a different parameter from the setting parameter set for an operation of the conveying units immediately before the temporary suspension among the parameters stored in the storage unit is set for the conveying units to cause an operation. When the work of the device is temporarily suspended, for example, the setting parameter becomes a parameter corresponding to a state in which residues, etc. of the articles are accumulated in the conveying units. For this reason, when the conveying units are controlled according to the setting parameter immediately before temporary suspension after the conveying units are cleaned, the conveying units convey the articles according to a parameter unsuitable for the state of the conveying units. In the combination weighing device, the conveying units are operated according to the restart parameter different from the setting parameter immediately before temporary suspension. Thus, for example, it is possible to control the conveying units according to a parameter suitable for the conveying units after cleaning. Therefore, in the combination weighing device, since the articles are more easily supplied to the hoppers at the target weighing value, selection of the combination is efficiently carried out. As a result, in the combination weighing device, even when a control characteristic related to an operation of a member associated with an operation of the device changes due to cleaning, replacement, etc. after the device is temporarily suspended and until the device is restarted, it is possible to perform restart without remarkably reducing work efficiency after restart when compared to that before temporary suspension.

In an embodiment, the combination weighing device may further include an input unit that receives at least a manipulation related to acquisition of the parameters set for the conveying unit from a manipulator, such as an operator, of the device, in which when the manipulation related to acquisition of the parameters is received by the input unit, the controller may acquire the parameters and cause the storage unit to store the acquired parameters. In this configuration, it is possible to acquire the parameters at an arbitrary timing of the manipulator.

In an embodiment, the combination weighing device may further include a display unit that displays information, in which the controller may cause the display unit to display information about acquisition of the restart parameter in the case of acquiring the restart parameter, and set the restart parameter for the conveying unit to cause an operation in the case of receiving an instruction to use the restart parameter displayed on the display unit by the input unit. In this configuration, the manipulator may select whether to use the restart parameter. Therefore, it is possible to perform control according to feeling of the manipulator.

In an embodiment, when a ratio of the number of times of combination establishment to the number of times of execution of combination weighing is set to a work rate, the controller may automatically acquire the parameters set for the conveying unit and cause the storage unit to store the acquired parameters when the work rate exceeds a predetermined value. In this configuration, efficient work can be performed by setting the predetermined value to, for example, 80% or more.

In an embodiment, when combination weighing is executed a predetermined number of times, the controller may automatically acquire the parameters set for the conveying unit and cause the storage unit to store the acquired parameters. In this configuration, parameters updated by a plurality of learning instances are acquired, and thus efficient work can be performed.

In an embodiment, the controller may determine whether a characteristic of the conveying unit has changed after the temporary suspension and until restart, acquire the restart parameter from the storage unit when it is determined that the characteristic of the conveying unit has changed as a result of the determination, acquire the setting parameter from the storage unit when it is determined that the characteristic of the conveying unit has not changed, and set the restart parameter or the setting parameter for the conveying unit to cause an operation. In this configuration, for example, a change in characteristic such as cleaning, replacement, etc. of the conveying unit is automatically determined, and thus it is possible to save effort for the manipulator to input the change in characteristic.

In an embodiment, the combination weighing device may further include a receiving unit that receives a manipulation as to whether to use the setting parameter from a manipulator of the device when the work of the device is temporarily suspended and then restarted, in which the controller may acquire the setting parameter from the storage unit in the case of receiving a manipulation for using the setting parameter by the receiving unit, acquire the restart parameter from the storage unit in the case of receiving a manipulation for not using the setting parameter by the receiving unit, and set the setting parameter or the restart parameter for the conveying unit to cause an operation. In this configuration, the manipulator may select use of the setting parameter or the restart parameter.

In an embodiment, the combination weighing device may further include a receiving unit that receives a manipulation by a manipulator of the device, in which in the case of receiving a signal for temporarily suspending the work of the device due to cleaning through the receiving unit, the controller may cause the manipulator to select whether to use the setting parameter during restart of the device. In this configuration, the manipulator may select use of the setting parameter.

Advantageous Effects of Invention

According to an aspect of the invention, restart may be performed without remarkably decreasing work efficiency after restart when compared to that before temporary suspension even in a case in which a control characteristic related to an operation of a member associated with an operation of a device changes due to cleaning, replacement, etc. after the device is temporarily suspended and until the device is restarted.

BRIEF DESCRIPTION OF DRAWINGS

FIG. 4(A) is a graph showing a relationship between a layer thickness and a supply amount, and FIG. 4(B) is a graph showing that a coefficient A and a coefficient B are updated over time.

DESCRIPTION OF EMBODIMENTS

Hereinafter, a preferred embodiment of the invention will be described in detail with reference to drawings. Incidentally, in description of the drawings, the same or a corresponding part is denoted by the same reference symbol, and duplicate description is omitted.

Figure 1:
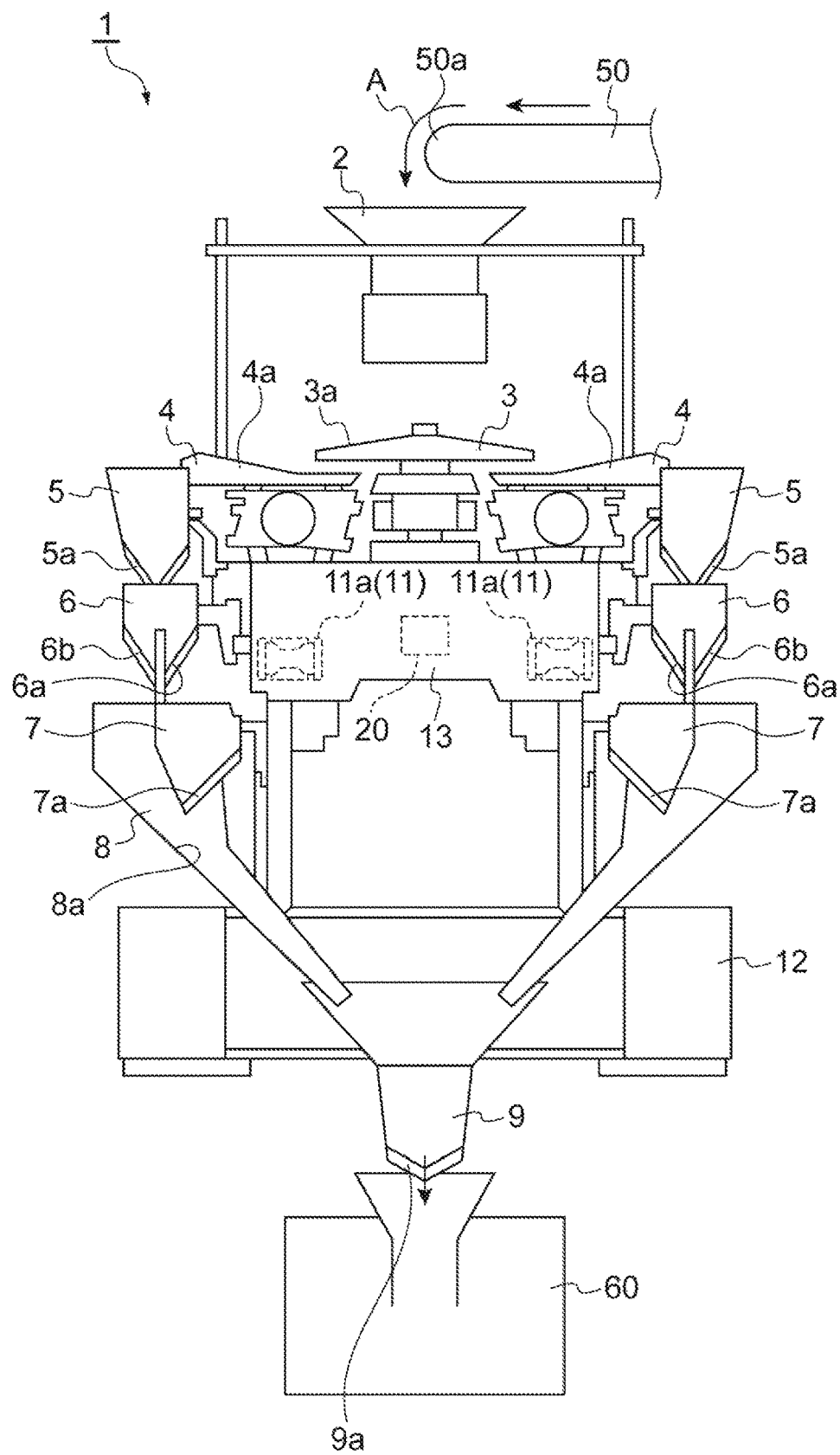
FIG. 1 is a diagram illustrating a configuration of a combination weighing device according to an embodiment.

As illustrated in FIG. 1, a combination weighing device 1 includes an charge chute 2, a dispersion feeder 3, a plurality of radiation feeders (conveying units) 4, a plurality of pool hoppers 5, a plurality of weighing hoppers (hoppers) 6, a plurality of booster hoppers (hoppers) 7, a collecting chute 8, a timing hopper 9, a weighing unit 11, and a controller 20. The combination weighing device 1 weighs articles supplied by a conveyance conveyor 50 such that the articles correspond to a target weighing value, and supplies the articles to a bag making/packaging machine 60. Here, the articles correspond to articles having variations in unit mass such as agricultural products, fishery products, and processed foods. Incidentally, the bag making/packaging machine 60 packages the articles weighed and supplied by the combination weighing device 1 while molding a film into a bag of a predetermined capacity.

The charge chute 2 is disposed below a conveying end 50a of the conveyance conveyor 50. The charge chute 2 receives the articles dropping from the conveying end 50a of the conveyance conveyor 50, and discharges the articles downward.

The dispersion feeder 3 is disposed below the charge chute 2. The dispersion feeder 3 has a conical conveying surface 3a that widens downward toward an end. The dispersion feeder 3 vibrates the conveying surface 3a to uniformly convey the articles discharged from the charge chute 2 to a top of the conveying surface 3a toward an outer edge of the conveying surface 3a.

The plurality of radiation feeders 4 is radially arranged along the outer edge of the conveying surface 3a of the dispersion feeder 3. Each of the radiation feeders 4 has a trough 4a extending outward from below the outer edge of the conveying surface 3a. Each radiation feeder 4 conveys the articles discharged from the outer edge of the conveying surface 3a toward a distal end of the trough 4a by vibrating the trough 4a.

Each of the pool hoppers 5 is disposed below the distal end of the trough 4a of each radiation feeder 4. A gate 5a allowed to be opened and closed is provided at a bottom of each pool hopper 5. Each pool hopper 5 temporarily stores the articles discharged from the distal end of the corresponding trough 4a in a state in which the gate 5a is closed, and discharges the temporarily stored articles downward by opening the gate 5a.

Each of the weighing hoppers 6 is disposed below the gate 5a of each pool hopper 5. A gate 6a and a gate 6b allowed to be opened and closed are provided at a bottom of each weighing hopper 6. Each weighing hopper 6 temporarily stores the articles discharged from the corresponding pool hopper 5 in a state in which the gate 6a and the gate 6b are closed, and discharges the temporarily stored articles downward by opening the gate 6a or the gate 6b.

Each of the booster hoppers 7 is disposed below the gate 6a of each weighing hopper 6. A gate 7a allowed to be opened and closed is provided at a bottom of each booster hopper 7. Each booster hopper 7 temporarily stores the articles discharged from the gate 6a side of the corresponding weighing hopper 6 in a state in which the gate 7a is closed, and discharges the temporarily stored articles downward by opening the gate 7a.

The collecting chute 8 is formed in a tubular shape having an inner surface 8a of a truncated cone tapering downward. The collecting chute 8 is disposed such that the inner surface 8a is located below all the weighing hoppers 6 and all the booster hoppers 7. The collecting chute 8 receives the articles discharged from the gate 6b side of each weighing hopper 6 and the articles discharged from each booster hopper 7 on the inner surface 8a and discharges the received articles downward.

The timing hopper 9 is disposed below the collecting chute 8. A gate 9a allowed to be opened and closed is provided at a bottom of the timing hopper 9. The timing hopper 9 temporarily stores the articles discharged from the collecting chute 8 in a state in which the gate 9a is closed, and discharges the temporarily stored articles to the bag making/packaging machine 60 by opening the gate 9a.

The weighing unit 11 is disposed in a case 13 supported on a frame 12. The weighing unit 11 has a plurality of load cells 11a. Each of the load cells 11a supports a corresponding weighing hopper 6. When the articles are temporarily stored in each weighing hopper 6, the weighing unit 11 weighs a weighing value according to the mass of the articles.

The controller 20 is disposed in the case 13. The controller 20 is a device that controls various operations in the combination weighing device 1, and is a signal processing device including a central processing unit (CPU), a read only memory (ROM), a random access memory (RAM), etc. The controller 20 controls an operation of each unit of the combination weighing device 1 such as a conveying operation of the dispersion feeder 3 and each radiation feeder 4, an opening/closing operation of the gate 5a of each pool hopper 5, an opening/closing operation of the gate 6a and the gate 6b of each weighing hopper 6, an opening/closing operation of the gate 7a of each booster hopper 7, and the gate 9a of each timing hopper 9.

The controller 20 stores the weighing value weighed by the weighing unit 11 and the weighing hopper 6 and/or the booster hopper 7 that store the articles corresponding to the weighing value in association with each other. Specifically, when the articles weighed by the weighing unit 11 are stored in the weighing hopper 6, the controller 20 stores the weighing value weighed by the weighing unit 11 and the weighing hopper 6 that stores the articles corresponding to the weighing value in association with each other. When the articles weighed by the weighing unit 11 are discharged to the booster hopper 7 corresponding to the weighing hopper 6, the controller 20 stores the weighing value of the articles weighed by the weighing unit 11 and the booster hopper 7 corresponding to the weighing hopper 6 in association with each other.

The controller 20 selects a combination of weighing values from a plurality of weighting values weighed by the weighing unit 11 and associated with the plurality of respective weighing hoppers 6 and/or booster hoppers 7 so that a total value becomes a target weighing value. Specifically, the controller 20 selects a combination of weighing values from a plurality of weighting values output by the weighing unit 11 so that a total value falls within a predetermined range having the target weighing value as a lower limit. Then, the controller 20 causes the weighing hopper 6 and/or booster hopper 7 corresponding to the combination to discharge the articles.

Incidentally, the charge chute 2, the dispersion feeder 3, the plurality of radiation feeders 4, the plurality of pool hoppers 5 and the plurality of weighing hoppers 6 are directly or indirectly supported by the case 13. The plurality of booster hoppers 7, the collecting chute 8, and the timing hopper 9 are directly or indirectly supported on the frame 12.

Figure 2:
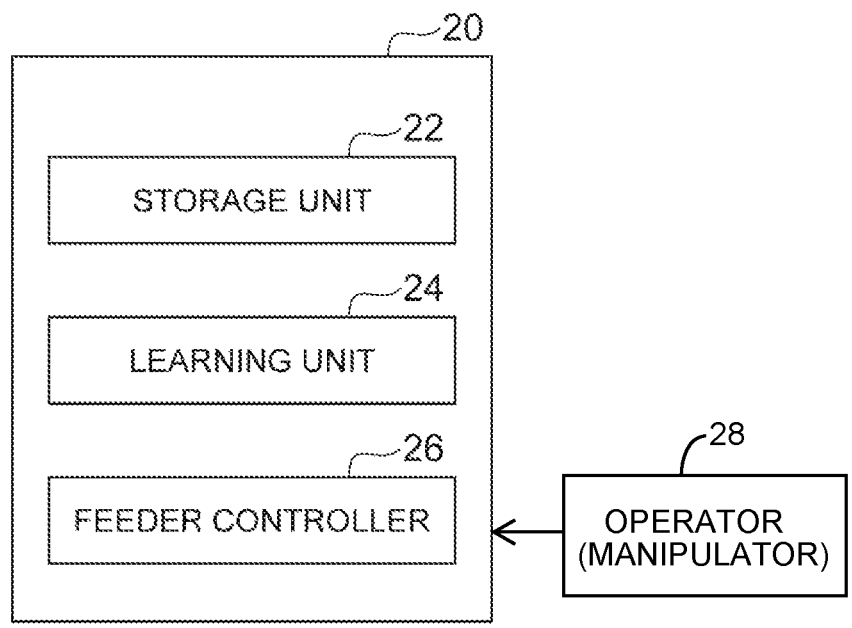
FIG. 2 is a diagram illustrating a functional configuration of a controller.

Next, the controller 20 will be described in more detail. FIG. 2 is a diagram illustrating a functional configuration of the controller. As illustrated in FIG. 2, the controller 20 includes a storage unit 22, a learning unit 24, a feeder controller 26, and an abnormality identification unit 28. The controller 20 has the storage unit 22, the learning unit 24, the feeder controller 26, and the abnormality identification unit 28 as conceptual parts for executing various control processes. For example, such a conceptual part may be configured as software in which a program stored in the ROM is loaded on the RAM and executed by the CPU.

The storage unit 22 stores a relationship among a layer thickness S of the articles on the radiation feeder 4, a target supply amount W of the radiation feeder 4, a feed force P of the radiation feeder 4, and an operation time t of the radiation feeder 4. The operation time is a duration during which the radiation feeder 4 is actually operating to convey the articles. Specifically, Equation (1) below is stored in the storage unit 22 for each operation time t. The storage unit 22 stores the above relationship for each of the plurality of radiation feeders 4.

$$P = A \times W/S + B \qquad (1)$$

The feed force P corresponds to the amplitude of vibration of the radiation feeder 4. When a value of the feed force P is small, the amplitude decreases, and thus a supply amount of the articles supplied from the radiation feeder 4 to the weighing hopper 6 (the pool hopper 5) decreases. When the value of the feed force P is large, the amplitude increases, and thus the supply amount of the articles supplied from the radiation feeder 4 to the weighing hopper 6 increases. The target supply amount W corresponds to the amount of the articles supplied from the radiation feeder 4 to the weighing hopper 6 through the pool hopper 5.

Figure 3:
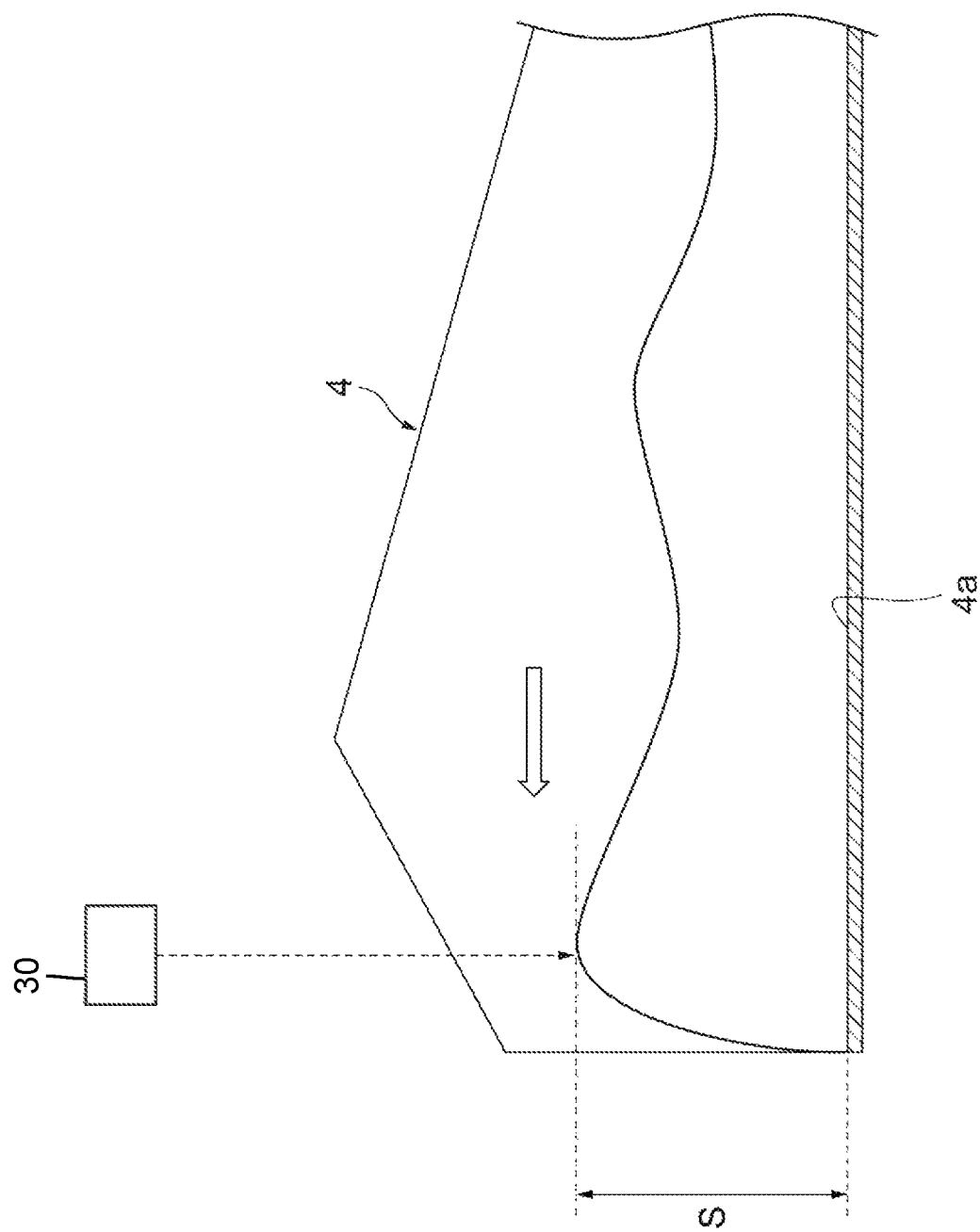
FIG. 3 is a diagram illustrating a part around a discharge end of a radiation feeder.

As illustrated in FIG. 3, the layer thickness S corresponds to a distance between a bottom surface 4s of the radiation feeder 4 and an upper portion of the articles around a discharge end of the radiation feeder 4. The layer thickness S is detected by a distance measuring sensor (detecting unit) 30. The distance measuring sensor 30 is disposed above each radiation feeder 4 to correspond to each radiation feeder 4. The distance measuring sensor 30 is attached to a support frame (not illustrated) and positioned above the radiation feeder 4.

The distance measuring sensor 30 detects a distance between the distance measuring sensor 30 and the articles on the radiation feeder 4. For example, the distance measuring sensor 30 obtains the distance between the distance measuring sensor 30 and the articles by irradiating light toward the articles and receiving light reflected by the articles. As illustrated in FIG. 3, the distance measuring sensor 30 detects a distance to the articles located around the discharge end of the radiation feeder 4. A position around the discharge end refers to a position shifted backward from a distal end of the radiation feeder 4 in a conveying direction by a predetermined distance. As an example, the position corresponds to a position shifted backward from the distal end of the radiation feeder 4 by about 30 mm to 50 mm. The distance measuring sensor 30 transmits a detection signal indicating the detected distance to the articles to the learning unit 24 and the feeder controller 26.

Incidentally, in the above description, a configuration in which the combination weighing device 1 has the distance measuring sensor 30 for detecting the layer thickness S has been described. However, the distance measuring sensor 30 may be configured as an external device different from the combination weighing device 1. In this case, the combination weighing device 1 simply acquires information related to the layer thickness S from this external device. In short, the distance measuring sensor 30 may not be an indispensable configuration. As a result, any configuration may be adopted as long as the combination weighing device 1 acquires the information related to the layer thickness S.

In the above Equation (1), each of "A" and "B" corresponds to a coefficient. The coefficient A and the coefficient B are parameters related to an operation of the conveying unit. The coefficient A and the coefficient B are parameters for linking a relationship between a value obtained based on the layer thickness S of the articles and the target supply amount W and the feed force P. Referring to the coefficient A and the coefficient B, in an initial state of the combination weighing device 1 (when work of the combination weighing device 1 is started for the first time), for example, a value empirically obtained according to the configuration of the combination weighing device 1 is given as an initial value (initial parameter). Each of the coefficient A and the coefficient B is a value that can be changed depending on the shape of the radiation feeder 4 and/or the type of the articles.

The learning unit 24 successively calculates the coefficient A and the coefficient B based on a relationship between the layer thickness 5, the target supply amount W, and the feed force P continuously acquired from the past. That is, the learning unit 24 calculates the coefficient A and the coefficient B by learning control.

Specifically, the learning unit 24 stores an actual supply amount W1 at the time of controlling the feed force P according to the layer thickness S to obtain the target supply amount W based on the above Equation (1) as history information at each operation time t. The learning unit 24 calculates the layer thickness S of the articles based on the distance indicated by the detection signal transmitted from the distance measuring sensor 30. Specifically, the learning unit 24 calculates the layer thickness S of the articles based on a difference between a distance from the bottom surface 4s of the radiation feeder 4 to the distance measuring sensor 30 and the distance indicated by the detection signal. The learning unit 24 stores the feed force P and a value (supply amount W1/layer thickness S) obtained by dividing the supply amount W1 by the layer thickness S in association with each other in the storage unit 22 for each operation time t.

The learning unit 24 calculates the coefficient A and the coefficient B based on a plurality of history information items stored in this way. In this case, the learning unit 24 calculates the coefficient A and the coefficient B on the assumption that the relationship represented by the above Equation (1) holds for the layer thickness S, the target supply amount W, and the feed force P. Specifically, for example, the learning unit 24 derives new coefficients A and B for each operation time t based on history information acquired so far using a least squares method, etc. In addition, when new coefficients A and B are derived, weights (the magnitude of an influence when the new coefficients A and B are determined) can be set for individual history information items. For example, information closer to a current time has a higher weight.

The learning unit 24 may calculate the new coefficients A and B at a timing when history information is updated. The coefficient A and the coefficient B are used in determining a current or future feed force P.

Here, FIG. 4(B) is a graph showing a change aspect of the target supply amount W actually input when the radiation feeder 4 is operated for a predetermined time in a case in which the feed force P set for the radiation feeder 4 is set and a predetermined layer thickness S is detected by the distance measuring sensor 30. The storage unit 22 stores one point shown in FIG. 4(B) as history information.

For example, the coefficient A and the coefficient B in the above description are acquired as slopes f1 to f4 shown in FIG. 4(B). Incidentally, an interval between fn and fn+1 adjacent to each other may be arbitrarily set by a designer. As the interval is set in more detail, the feed force P can be more accurately set.

Numerical accuracy of the coefficient A and the coefficient B increases as the learning unit 24 acquires various operation times t, layer thicknesses S, and feed forces P in different combinations.

The feeder controller 26 controls the feed force P of the radiation feeder 4. The feeder controller 26 controls the radiation feeder 4 by the feed force P obtained from the layer thickness S of the articles based on the distance detected by the distance measuring sensor 30 and the supply amount W1 corresponding to a set target supply amount using the above Equation (1). The feeder controller 26 substitutes the layer thickness S of the articles and the supply amount W1 corresponding to the target supply amount into the above Equation (1) to calculate the feed force P. The feeder controller 26 controls an operation of the continuously operating radiation feeder 4 by the calculated feed force P.

In a case in which the combination weighing device 1 is restarted after the work of the combination weighing device 1 is temporarily suspended, the feeder controller 26 acquires a coefficient A and a coefficient B (setting parameters) immediately before temporary suspension and a coefficient A and a coefficient B (restart parameters) different from initial values. When the combination weighing device 1 is restarted, the feeder controller 26 controls the operation of the radiation feeder 4 according to the acquired parameter A and parameter B. For example, temporary suspension refers to suspending the operation of the dispersion feeder 3, the radiation feeder 4, etc. to clean or replace the radiation feeder 4. In this case, a power supply of the combination weighing device 1 may be turned OFF or turned ON. In addition, for example, "immediately before temporary suspension" includes a case in which a button commanding temporary suspension is pressed by a manipulator, such as an operator 28, and refers to a predetermined time before pressing. For example, "restart" means that the button commanding temporary suspension is pressed by the manipulator and the operation of the dispersion feeder 3, the radiation feeder 4, etc. is started in the temporarily suspended combination weighing device 1.

The feeder controller 26 automatically acquires the coefficient A and the coefficient B immediately before temporary suspension and the coefficient A and the coefficient B different from the initial values. In the present embodiment, when a ratio of the number of times of combination establishment to the number of times of execution of combination weighing based on the coefficient A and the coefficient B is set to a work rate, the feeder controller 26 automatically acquires the coefficient A and the coefficient B when the work rate exceeds a predetermined value. The feeder controller 26 stores the acquired coefficient A and coefficient B in the storage unit 22.

The predetermined value in the above description may be any value and may be set to, for example, 90% considering that the work rate increases when conveyance of the articles is easily controlled. On the other hand, the predetermined value may be set to, for example, 70% considering that the work rate decreases when conveyance of the articles is difficult to control. Information related to easiness of control of conveyance of the articles may be directly input by a user of the combination weighing device 1 or automatically determined from a conveyance state of the articles. Hereinafter, for convenience of description, a description will be given of an operation of automatically acquiring the coefficient A and the coefficient B when the work rate reaches 80%.

Incidentally, the predetermined value used for automatically acquiring the coefficient A and the coefficient B may be a value directly input by the user of the combination weighing device 1 or a value previously set at the time of manufacturing the combination weighing device 1.

Figure 5:
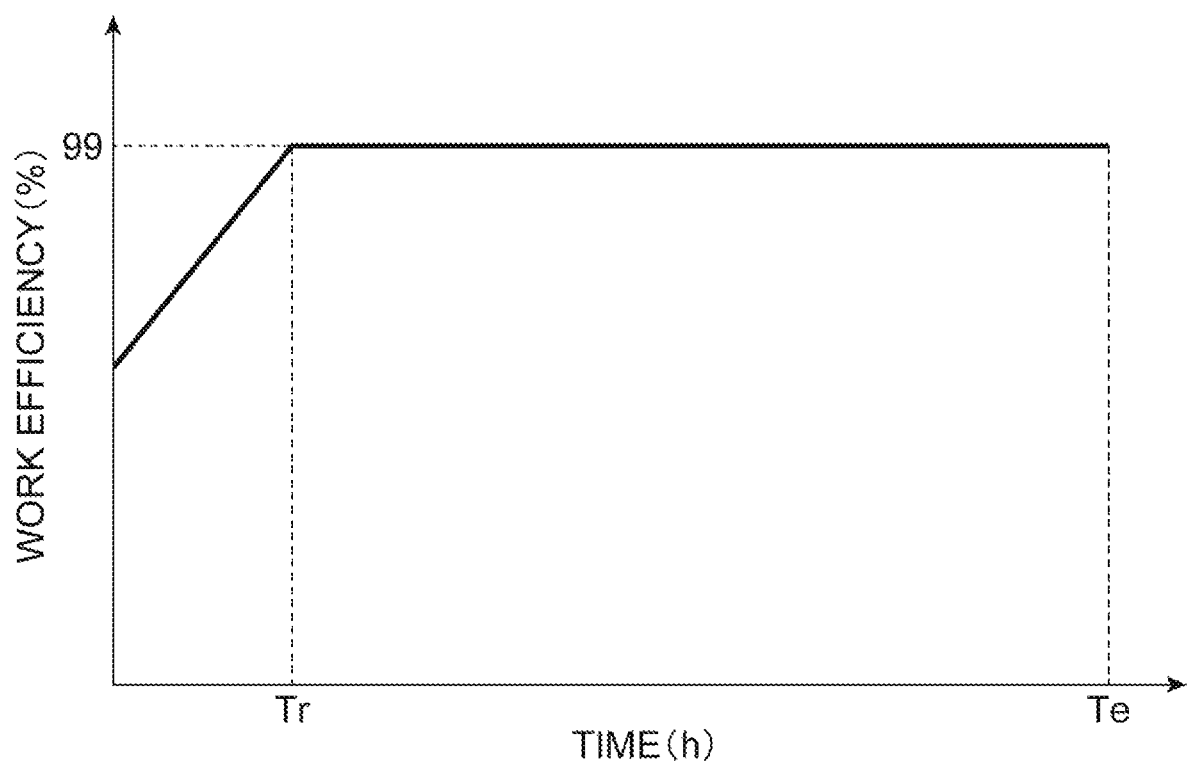
FIG. 5 is a diagram illustrating a relationship between time and a work rate.

Specifically, when the work of the combination weighing device 1 is temporarily suspended at a time Te as illustrated in FIG. 5, the feeder controller 26 automatically acquires a coefficient A and a coefficient B used at a time Tr when the work rate reaches, for example, 99%. The feeder controller 26 acquires the coefficient A and the coefficient B for all the radiation feeders 4.

When the combination weighing device 1 is to be restarted, the feeder controller 26 reads the coefficient A and the coefficient B from the storage unit 22 and controls the operation of the radiation feeder 4 according to the read coefficient A and coefficient B. At the time of restarting, the feeder controller 26 reads a coefficient A and a coefficient B of the radiation feeder 4 in a different state from that before temporary suspension from the storage unit 22 and controls the operation of the radiation feeder 4 according to the read coefficient A and coefficient B.

Specifically, for example, when all the radiation feeders 4 are cleaned or replaced, the feeder controller 26 reads the coefficients A and the coefficients B of all the radiation feeders 4 from the storage unit 22, and controls an operation of each of the radiation feeders 4 according to each of the coefficients A and the coefficients B. For example, when one radiation feeder 4 is cleaned or replaced, the feeder controller 26 reads a coefficient A and a coefficient B of the cleaned or replaced radiation feeder 4 from the storage unit 22, and controls an operation of the radiation feeder 4 after replacement according to the coefficient A and the coefficient B. For example, the feeder controller 26 recognizes that the radiation feeder 4 has been cleaned or replaced by input at an input unit of the manipulator.

Incidentally, for a radiation feeder 4 not replaced by cleaning, etc. after temporary suspension and until restart, the feeder controller 26 may control an operation of the radiation feeder 4, which has not been replaced, using a coefficient A and a coefficient B immediately before temporary suspension. In this case, since a control characteristic related to conveyance of the radiation feeder 4 does not substantially change after temporary suspension and until restart, it is preferable to use the coefficient A and the coefficient B immediately before temporary suspension.

As described above, in the combination weighing device 1 according to the present embodiment, when the work of the device is restarted after being temporarily suspended, a coefficient A and a coefficient B different from the coefficient A and the coefficient B set for the operation of the radiation feeder 4 immediately before temporary suspension among coefficients A and coefficients B stored in the storage unit 22 are set in the radiation feeder 4 to perform an operation. When the work of the device is temporarily suspended, for example, the coefficient A and the coefficient B become coefficients corresponding to a state in which residues, etc. of the articles are accumulated in the radiation feeder 4. For this reason, when the radiation feeder 4 is controlled according to the coefficient A and the coefficient B immediately before temporary suspension after the radiation feeder 4 is cleaned, the radiation feeder 4 conveys the articles according to a coefficient unsuitable for the state of the radiation feeder 4. In the combination weighing device 1, the radiation feeder 4 is operated according to the coefficient A and the coefficient B different from the coefficient A and the coefficient B immediately before temporary suspension. Thus, for example, it is possible to control the radiation feeder 4 according to the coefficient A and the coefficient B suitable for the radiation feeder 4 after cleaning or after replacement. Therefore, in the combination weighing device 1, since the articles are more easily supplied to the weighing hopper 6 at the target weighing value, selection of the combination is efficiently carried out. As a result, in the combination weighing device 1, even when the control characteristic of the radiation feeder 4 changes due to cleaning, replacement, etc. after the device is temporarily suspended and until the device is restarted, it is possible to perform restart without remarkably reducing work efficiency after restart when compared to that before temporary suspension.

In the present embodiment, the feeder controller 26 automatically reads the coefficient A and the coefficient B from the storage unit 22, and controls the operation of the radiation feeder 4 according to the read coefficient A and coefficient B. In this configuration, the coefficient A and the coefficient B are automatically applied to control the radiation feeder 4, and thus it is possible to rapidly and accurately control the radiation feeder 4 when the combination weighing device 1 is restarted.

In the present embodiment, when a ratio of the number of times of combination establishment to the number of times of execution of combination weighing is set to a work rate, the feeder controller 26 automatically acquires the coefficient A and the coefficient B set in the radiation feeder 4 when the work rate exceeds a predetermined value, and stores the acquired coefficient A and coefficient B in the storage unit 22. In the present embodiment, the feeder controller 26 acquires the coefficient A and the coefficient B when the work rate reaches 99%. In this configuration, since the coefficient A and the coefficient B corresponding to a case in which the work rate is high are acquired, efficient work becomes possible.

Even though the embodiment of the invention has been described above, the invention is not limited to the above embodiment. For example, the conveying unit of the invention is not limited to the above-described dispersion feeder 3 and the plurality of radiation feeders 4, and may correspond to any conveying unit as long as the conveying unit has a configuration capable of conveying articles. Further, the plurality of hoppers of the invention is not limited to those disposed in an annular shape such as the plurality of weighing hoppers 6 and the plurality of booster hoppers 7 described above, and may correspond to those disposed in a shape of a matrix. In addition, the combination weighing device of the invention may not include the plurality of booster hoppers 7.

In the above embodiment, a mode in which the feeder controller 26 automatically acquires the coefficient A and the coefficient B has been described as an example. However, the coefficient A and the coefficient B may be acquired by accepting an input by the manipulator. Specifically, the feeder controller 26 reports a timing of acquiring the coefficient A and the coefficient B using a reporting unit, and acquires the coefficient A and the coefficient B and stores the acquired coefficient A and coefficient B in the storage unit 22 in the case of receiving an instruction to acquire the coefficient A and the coefficient B by the input unit. For example, the timing of acquiring the coefficient A and the coefficient B corresponds to a timing when the work rate reaches 99%. For example, the reporting unit is a display, a buzzer, etc. For example, the input unit is a key, a touch panel display, etc.

For example, the feeder controller 26 reports the timing of acquiring the coefficient A and the coefficient B using the touch panel display, and acquires the coefficient A and the coefficient B and stores the acquired coefficient A and coefficient B in the storage unit 22 in the case of receiving an instruction to acquire the coefficient A and the coefficient B by the touch panel display.

In addition, the feeder controller 26 may display information about acquiring the coefficient A and the coefficient B on a display unit (for example, a touch panel display, etc.) in the case of acquiring the coefficient A and the coefficient B, store the acquired coefficient A and coefficient B in the storage unit 22 in the case of receiving an instruction to use the acquired coefficient A and coefficient B by the input unit, and control the operation of the radiation feeder 4 according to the coefficient A and the coefficient B when the combination weighing device 1 is restarted.

In the above embodiment, a mode in which when the combination weighing device 1 is restarted, the feeder controller 26 automatically reads the coefficient A and the coefficient B from the storage unit 22 and controls the operation of the radiation feeder 4 using the read coefficient A and coefficient B has been described as an example. However, the coefficient A and the coefficient B may be selected by the manipulator. Specifically, the feeder controller 26 reads the coefficient A and the coefficient B from the storage unit 22 and causes the display unit to display the read coefficient A. and coefficient B, and controls the operation of the radiation feeder 4 according to the coefficient A and the coefficient B when an instruction to select the coefficient A and the coefficient B is received by the input unit. For example, the reporting unit is a display, a touch panel display, etc. For example, the input unit is a key, a touch panel display, etc.

For example, the feeder controller 26 reads the coefficient A and the coefficient B from the storage unit 22 and causes the touch panel display to display the read coefficient A and coefficient B when the combination weighing device 1 is restarted, and controls the operation of the radiation feeder 4 according to the coefficient A and the coefficient B when an instruction to select the coefficient A and the coefficient B is received by the touch panel display from the manipulator.

In addition, in the case of receiving a manipulation for using the coefficient A and the coefficient B (setting parameters) set for the operation of the radiation feeder 4 immediately before temporary suspension in the input unit (receiving unit), the feeder controller 26 acquires the coefficient A and the coefficient B from the storage unit 22. In the case of receiving a manipulation for not using the coefficient A and the coefficient B set for the operation of the radiation feeder 4 immediately before temporary suspension in the input unit, the feeder controller 26 acquires the coefficient A and the coefficient B (restart parameters) from the storage unit 22. The feeder controller 26 causes the radiation feeder 4 to operate according to the acquired coefficient A and coefficient B.

In addition, in the case of receiving a signal for temporarily suspending the work of the combination weighing device 1 due to cleaning through the input unit (receiving unit), the feeder controller 26 may cause the manipulator to select whether to use the coefficient A and the coefficient B at the time of restarting the combination weighing device 1. In the case of receiving an instruction to temporarily suspend the work of the combination weighing device 1 due to cleaning by the touch panel display from the manipulator, the feeder controller 26 causes the touch panel display to display a screen for selecting whether to use the coefficient A and the coefficient B. In the case of receiving a manipulation for using the coefficient A and the coefficient B, the feeder controller 26 acquires the coefficient A and the coefficient B from the storage unit 22, and causes the radiation feeder 4 to operate according to the acquired coefficient A and coefficient B.

In the above embodiment, a mode in which the feeder controller 26 acquires one coefficient A and one coefficient B has been described as an example. However, the feeder controller 26 may acquire a plurality of coefficients A and coefficients B. For example, the feeder controller 26 automatically acquires a plurality of coefficients A and coefficients B at a predetermined timing. Further, in the case of a mode in which the coefficient A and the coefficient B are acquired by an input of the manipulator, the feeder controller 26 causes the reporting unit to report a timing of acquiring the coefficient A and the coefficient B at a predetermined timing.

In the case of a mode of automatically reading the coefficient A and the coefficient B from the storage unit 22 when the combination weighing device 1 is restarted, the feeder controller 26 reads a coefficient A and a coefficient B at an optimum timing from the storage unit 22 based on a predetermined condition from a plurality of coefficients A and coefficients B. In the case of selecting the coefficient A and the coefficient B by an input of the manipulator when the combination weighing device 1 is restarted, the feeder controller 26 causes the display to display candidates for a plurality of coefficients A and coefficients B. The feeder controller 26 controls the operation of the radiation feeder 4 after restart according to the coefficient A and the coefficient B selected through the input unit from among the candidates for the plurality of coefficients A and coefficients B. Incidentally, it is preferable that the candidates for the plurality of coefficients A and coefficients B, a work rate at the time of acquiring each coefficient A and coefficient B, etc. are displayed on the display unit.

In the above embodiment, a mode in which the feeder controller 26 acquires the coefficient A and the coefficient B when the work rate reaches 99% has been described as an example. However, a timing of acquiring the coefficient A and the coefficient B is not limited thereto. For example, the feeder controller 26 may acquire the coefficient A and the coefficient B when combination weighing is executed a predetermined number of times. Alternatively, the feeder controller 26 may acquire the coefficient A and the coefficient B when a predetermined time elapses since the work of the combination weighing device 1 has started. In short, the feeder controller 26 may acquire the coefficient A and the coefficient B immediately before the combination weighing device 1 is temporarily suspended and the coefficient A and the coefficient B different from the initial values. From a viewpoint of efficient work, it is preferable to acquire the coefficient A and the coefficient B after the work rate becomes 99% or more.

In the above embodiment, a mode in which the feeder controller 26 recognizes that the radiation feeder 4 has been cleaned or replaced by an input of the manipulator in the input unit has been described as an example. However, the radiation feeder 4 may determine whether a characteristic of the radiation feeder 4 has changed after temporary suspension and until restart of the combination weighing device 1. The change in characteristic corresponds to cleaning of the radiation feeder 4, replacement of the radiation feeder 4, etc. For example, whether the characteristic has changed is determined based on the presence/absence of attachment/detachment of the radiation feeder 4, presence/absence of failure of the radiation feeder 4, etc. When it is determined that the characteristic of the radiation feeder 4 has changed as a result of determination, the feeder controller 26 acquires the coefficient A and the coefficient B from the storage unit 22. On the other hand, when it is determined that the characteristic of the radiation feeder 4 has not changed, the feeder controller 26 acquires the coefficient A and the coefficient B set for the operation of the radiation feeder 4 immediately before temporary suspension from the storage unit 22. The feeder controller 26 causes the radiation feeder 4 to operate according to the acquired coefficient A and coefficient B.

In the above embodiment, a mode in which the controller 20 includes the storage unit 22, the learning unit 24, and the feeder controller 26 has been described as an example. However, the storage unit 22, the learning unit 24, and the feeder controller 26 may be provided separately from the controller 20.

The distance measuring sensor 30 has been described as an example of the detecting unit. However, the detecting unit is not limited to the distance measuring sensor 30. For example, the detecting unit may correspond to a camera, etc.

In the above embodiment, a mode in which one distance measuring sensor 30 is provided to correspond to each radiation feeder 4 has been described as an example. However, a plurality of distance measuring sensors 30 may be provided along the conveying direction of the radiation feeder 4. In this way, it is possible to detect layer thicknesses of the articles at a plurality of positions. For this reason, it is possible to detect the radiation feeder 4 based on an overall state of the articles conveyed by the radiation feeder 4.

In the above embodiment, a mode in which one distance measuring sensor 30 is provided to correspond to each radiation feeder 4 has been described as an example. However, the distance measuring sensor 30 may not be provided to correspond to each radiation feeder 4. For example, two distance measuring sensors 30 may be provided at an interval with respect to radially disposed radiation feeders 4. The supply amount of the articles supplied from the dispersion feeder 3 may not be significantly different between adjacent radiation feeders 4. Therefore, a result detected by one distance measuring sensor 30 is used as a distance to the articles in radiation feeders 4 disposed on both sides of the radiation feeder 4 detected by the distance measuring sensor 30. In this case, since the number of distance measuring sensors (detecting units) can be reduced, cost can be reduced.

In the above embodiment, a mode in which the feed force P of the radiation feeder 4 corresponds to the amplitude has been described as an example. However, the feed force P may correspond to a vibration time of the radiation feeder 4. Alternatively, the feed force P may correspond to both the amplitude and the vibration time.

In the above embodiment, a mode in which the learning unit 24 calculates the layer thickness S of the articles based on the detection signal detected by the distance measuring sensor 30, and the feed force P is obtained using the calculated layer thickness S has been described as an example. However, it is possible to adopt a mode in which the feed force P is obtained without calculating the layer thickness S. In the case of this configuration, Equation (2) below is used for calculation of the feed force P.

$$P = A1 \times W/(L - Sp) + B1 \tag{2}$$

In the above Equation (4), each of "A1" and "B1" corresponds to a coefficient. "L" denotes a distance from the bottom surface 4s of the radiation feeder 4 to the distance measuring sensor 30. "Sp" denotes a detection value (a distance between the distance measuring sensor 30 and the articles) indicated by the detection signal of the distance measuring sensor 30. In response to receiving the detection signal transmitted from the distance measuring sensor 30, the feeder controller 26 substitutes the detection value Sp indicated by the detection signal and the supply amount W1 corresponding to the target supply amount into the above Equation (2) to calculate the feed force P.

In addition to the above embodiment, the target supply amount W, the coefficient A, and the coefficient B may be stored in the storage unit 22 to correspond to a shape of a conveyance path of the articles and/or the radiation feeder 4. In this way, it is possible to perform control according to the shape of the conveyance path of the articles and/or the radiation feeder 4. For this reason, it is possible to save time and effort for the operator to change setting of a coefficient, etc. for each shape of the conveyance path of the articles and/or the radiation feeder 4.

In the above embodiment, the radiation feeder 4 has been described as an example of the conveying unit. However, for example, the conveying unit may convey the articles using a coil unit (screw) that can be driven to rotate or a belt conveyor. In the case of the coil unit, the feeder controller 26 controls revolutions per minute (rpm), etc. of the coil unit as the feed force. In addition, in the case of the belt conveyor, the feeder controller 26 controls rpm, etc. of a roller that drives a belt.

In the above embodiment, a mode in which the combination weighing device 1 includes the dispersion feeder 3, and the radiation feeders 4 are radially arranged around the dispersion feeder 3 to have circular arrangement has been described as an example. However, the combination weighing device may have linear arrangement in which each of the conveying unit and the weighing unit is linearly arranged and disposed.

In the above embodiment, a description has been given using the combination weighing device 1. However, the invention is applicable to a device, an operation of which is temporarily suspended and restarted thereafter, in which a control characteristic of a member of the device related to replacement, etc. changes when the member is replaced, etc. after the operation is temporarily suspended and until the operation is restarted. For example, the invention is applicable to a device for placing articles by the user to perform combination weighing, a vertical type bag making/packaging machine, an inspection device using an X-ray, etc.

REFERENCE SIGNS LIST

1: combination weighing device, 4: radiation feeder (conveying unit), 6: weighing hopper (hopper), 7: booster hopper (hopper), 11: weighing unit, 20: controller, 22: storage unit, 24: learning unit, 26: feeder controller (controller).

The invention claimed is:

1. A combination weighing device comprising:
a plurality of conveying units that conveys articles;
a plurality of hoppers that temporarily stores the articles conveyed by the conveying units;
a weighing unit that weighs a weighing value according to a mass of the articles stored in each of the hoppers;
a controller that selects a combination of weighing values from a plurality of weighing values weighed by the weighing unit and associated with each of the plurality of hoppers so that a total value corresponds to a target weighing value, and causes the hopper corresponding to the combination to discharge the articles;
a learning unit that updates parameters for setting operations of the conveying units by learning; and
a storage unit that stores at least some parameters among the parameters updated by the learning unit,
wherein the controller
causes the storage unit to store the parameters updated by the learning unit, and
sets, for the conveying units, a restart parameter corresponding to a different parameter from a setting parameter set for an operation of the conveying units immediately before temporary suspension among the parameters stored in the storage unit to cause an operation in a case in which work of the device is temporarily suspended and then restarted, and
wherein when combination weighing is executed a predetermined number of times, the controller automatically acquires the parameters set for the conveying unit and causes the storage unit to store the acquired parameters.

2. The combination weighing device according to claim 1, further comprising
an input unit that receives at least a manipulation related to acquisition of the parameters set for the conveying unit from an operator of the device,
wherein when the manipulation related to acquisition of the parameters is received by the input unit, the controller acquires the parameters and causes the storage unit to store the acquired parameters.

3. The combination weighing device according to claim 2, further comprising
a display unit that displays information,
wherein the controller
causes the display unit to display information about acquisition of the restart parameter in the case of acquiring the restart parameter, and
sets the restart parameter for the conveying unit to cause an operation in the case of receiving an instruction to use the restart parameter displayed on the display unit by the input unit.

4. The combination weighing device according claim 1, wherein when a ratio of the number of times of combination establishment to the number of times of execution of combination weighing is set to a work rate, the controller automatically acquires the parameters set for the conveying unit and causes the storage unit to store the acquired parameters when the work rate exceeds a predetermined value.

5. The combination weighing device according to claim 1, wherein the controller determines whether a characteristic of the conveying unit has changed after the temporary suspension and until restart, acquires the restart parameter from the storage unit when it is determined that the characteristic of the conveying unit has changed as a result of the determination, acquires the setting parameter from the storage unit when it is determined that the characteristic of the conveying unit has not changed, and sets the restart parameter or the setting parameter for the conveying unit to cause an operation.

6. The combination weighing device according to claim 1, further comprising
a receiving unit that receives a manipulation as to whether to use the setting parameter from an operator of the device when the work of the device is temporarily suspended and then restarted,
wherein the controller acquires the setting parameter from the storage unit in the case of receiving a manipulation for using the setting parameter by the receiving unit, acquires the restart parameter from the storage unit in the case of receiving a manipulation for not using the setting parameter by the receiving unit, and sets the setting parameter or the restart parameter for the conveying unit to cause an operation.

7. The combination weighing device according to claim 1, further comprising
a receiving unit that receives a manipulation by an operator of the device,
wherein in the case of receiving a signal for temporarily suspending the work of the device due to cleaning through the receiving unit, the controller causes the operator to select whether to use the setting parameter during restart of the device.

8. A combination weighing device comprising:
a plurality of conveying units that conveys articles;
a plurality of hoppers that temporarily stores the articles conveyed by the conveying units;
a weighing unit that weighs a weighing value according to a mass of the articles stored in each of the hoppers;
a controller that selects a combination of weighing values from a plurality of weighing values weighed by the weighing unit and associated with each of the plurality of hoppers so that a total value corresponds to a target weighing value, and causes the hopper corresponding to the combination to discharge the articles;
a learning unit that updates parameters for setting operations of the conveying units by learning; and a storage unit that stores at least some parameters among the parameters updated by the learning unit, wherein the controller causes the storage unit to store the parameters updated by the learning unit, and sets, for the conveying units, a restart parameter corresponding to a different parameter from a setting parameter set for an operation of the conveying units immediately before temporary suspension among the parameters stored in the storage unit to cause an operation in a case in which work of the device is temporarily suspended and then restarted, and wherein when a ratio of the number of times of combination establishment to the number of times of execution of combination weighing is set to a work rate, the controller automatically acquires the parameters set for the conveying unit and causes the storage unit to store the acquired parameters when the work rate exceeds a predetermined value.

9. The combination weighing device according to claim 8, further comprising an input unit that receives at least a manipulation related to acquisition of the parameters set for the conveying unit from an operator of the device, wherein when the manipulation related to acquisition of the parameters is received by the input unit, the controller acquires the parameters and causes the storage unit to store the acquired parameters.

10. The combination weighing device according to claim 9, further comprising a display unit that displays information, wherein the controller causes the display unit to display information about acquisition of the restart parameter in the case of acquiring the restart parameter, and sets the restart parameter for the conveying unit to cause an operation in the case of receiving an instruction to use the restart parameter displayed on the display unit by the input unit.

11. The combination weighing device according to claim 8, wherein the controller determines whether a characteristic of the conveying unit has changed after the temporary suspension and until restart, acquires the restart parameter from the storage unit when it is determined that the characteristic of the conveying unit has changed as a result of the determination, acquires the setting parameter from the storage unit when it is determined that the characteristic of the conveying unit has not changed, and sets the restart parameter or the setting parameter for the conveying unit to cause an operation.

12. The combination weighing device according to claim 8, further comprising a receiving unit that receives a manipulation as to whether to use the setting parameter from an operator of the device when the work of the device is temporarily suspended and then restarted, wherein the controller acquires the setting parameter from the storage unit in the case of receiving a manipulation for using the setting parameter by the receiving unit, acquires the restart parameter from the storage unit in the case of receiving a manipulation for not using the setting parameter by the receiving unit, and sets the setting parameter or the restart parameter for the conveying unit to cause an operation.

13. The combination weighing device according to claim 8, further comprising a receiving unit that receives a manipulation by an operator of the device, wherein in the case of receiving a signal for temporarily suspending the work of the device due to cleaning through the receiving unit, the controller causes the operator to select whether to use the setting parameter during restart of the device.

14. A combination weighing device comprising:

a plurality of conveying units that conveys articles;

a plurality of hoppers that temporarily stores the articles conveyed by the conveying units;

a weighing unit that weighs a weighing value according to a mass of the articles stored in each of the hoppers;

a controller that selects a combination of weighing values from a plurality of weighing values weighed by the weighing unit and associated with each of the plurality of hoppers so that a total value corresponds to a target weighing value, and causes the hopper corresponding to the combination to discharge the articles;

a learning unit that updates parameters for setting operations of the conveying units by learning; and a storage unit that stores at least some parameters among the parameters updated by the learning unit, wherein the controller causes the storage unit to store the parameters updated by the learning unit, sets, for the conveying units, a restart parameter corresponding to a different parameter from a setting parameter set for an operation of the conveying units immediately before temporary suspension among the parameters stored in the storage unit to cause an operation in a case in which work of the device is temporarily suspended and then restarted, and determines whether a characteristic of the conveying unit has changed after the temporary suspension and until restart, acquires the restart parameter from the storage unit when it is determined that the characteristic of the conveying unit has changed as a result of the determination, acquires the setting parameter from the storage unit when it is determined that the characteristic of the conveying unit has not changed, and sets the restart parameter or the setting parameter for the conveying unit to cause an operation.

15. The combination weighing device according to claim 14, further comprising an input unit that receives at least a manipulation related to acquisition of the parameters set for the conveying unit from an operator of the device, wherein when the manipulation related to acquisition of the parameters is received by the input unit, the controller acquires the parameters and causes the storage unit to store the acquired parameters.

16. The combination weighing device according to claim 15, further comprising a display unit that displays information, wherein the controller causes the display unit to display information about acquisition of the restart parameter in the case of acquiring the restart parameter, and sets the restart parameter for the conveying unit to cause an operation in the case of receiving an instruction to use the restart parameter displayed on the display unit by the input unit.

17. The combination weighing device according to claim 14, further comprising a receiving unit that receives a manipulation as to whether to use the setting parameter from an operator of the device when the work of the device is temporarily suspended and then restarted, wherein the controller acquires the setting parameter from the storage unit in the case of receiving a manipulation for using the setting parameter by the receiving unit, acquires the restart parameter from the storage unit in the case of receiving a manipulation for not using the setting parameter by the receiving unit, and sets the setting parameter or the restart parameter for the conveying unit to cause an operation.

18. The combination weighing device according to claim 14, further comprising a receiving unit that receives a manipulation by an operator of the device, wherein in the case of receiving a signal for temporarily suspending the work of the device due to cleaning through the receiving unit, the controller causes the operator to select whether to use the setting parameter during restart of the device.

* * * * *